July 8, 1958     H. LOHEST     2,842,728
MOTOR CONTROL SYSTEM
Filed Jan. 4, 1957
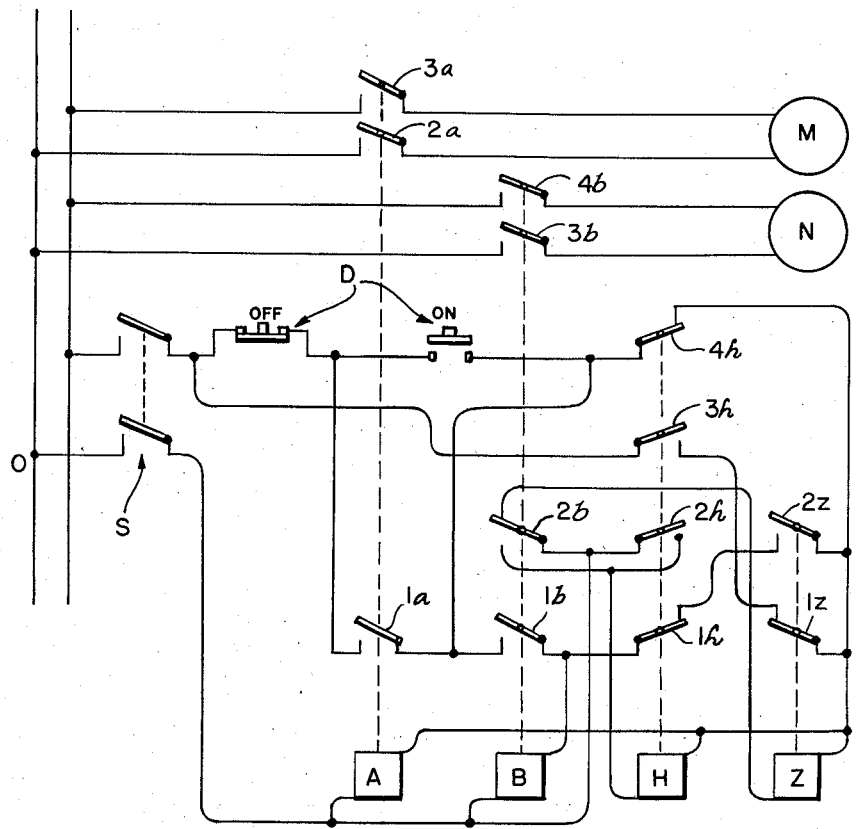
INVENTOR:—
HANS LOHEST
BY:—
Marzall, Johnston, Cook & Root
ATTORNEYS

United States Patent Office 2,842,728
Patented July 8, 1958

2,842,728

MOTOR CONTROL SYSTEM

Hans Lohest, Remscheid-Lennep, Germany, assignor to Barmer Maschinenfabrik Aktiengesellschaft, Remscheid-Lennep, Germany Application January 4, 1957, Serial No. 632,506

Claims priority, application Germany January 7, 1956

2 Claims. (Cl. 318—102)

The present invention relates in general to the control of electric motors, and has more particular reference to an improved switching system for controlling apparatus embodying a plurality of motors operating conjointly to accomplish a desired objective.

Apparatus comprising multiple motors is commonly used in many branches of industry to accomplish the working operation of several different functioning components of a machine which are associated in a selected relationship, in order to attain a desired result. Such motors are frequently controlled by common switching means, but may reach their full operating speeds in succession, or in any desired or required time sequence.

Multiple motor apparatus of the character mentioned is commonly employed in the textile industry, in which, for example, the motors of a spinning or a twisting machine, depending upon the requirements of a particular operation, may be started in succession under the control of suitable delaying equipment which may comprise mechanical or electrical delayed operating switches, slow acting relays or the like.

When motors are switched off, the time intervals within which they reach stationary or static condition are usually of no importance; however, under special circumstances it may be desirable to regulate the stopping of such motors so that the same may reach static or stationary condition in a definite sequence or at particular rates of deceleration. Where motors are to be stopped in the same succession in which started, in most cases the same controlling devices employed in starting the motors in operation may be used in bringing the motors to a stop. Conditions are different, however, where motor stoppage is required to take place in a reverse sequence from that in which the motors are started. In such case, special switching arrangements for starting and stopping the motors has to be supplied.

An important object of the present invention is to provide a multiple motor switching system, particularly for motors used in powering textile machinery, in which the motors are started in a desired sequence, and, are switched off in reverse order by means of the same switching mechanism employed in starting the motors; a further object being to provide an auxiliary relay, in addition to a slow acting relay employed in both the starting and stopping processes. The slow acting relay may be of any suitable, preferred or conventional construction, and may cause motor stoppage by thermal, magnetic, electronic, electrolytic, or other customary expedient.

The present invention has the advantage over conventional motor controlling systems, in that the same slow acting or time delay relay is employed both for the starting, as well as the stopping of the controlled motive means; and in both cases accomplishes the retardation of the starting and stopping of the motors, particularly where the same are stopped in reverse order, as compared with the starting thereof, whereas in motor control systems of the sort heretofore known, a number of slow acting relays are required for the accomplishment of the desired result. As a consequence, the switching mechanism of the present invention is considerably less expensive than comparable systems of the sort heretofore proposed.

The foregoing and numerous other important objects, advantages and inherent functions of the invention will become apparent as the same is more fully understood from the following description, which, taken in connection with the accompanying drawing, discloses a preferred embodiment of the invention.

Referring to the drawings:

The single figure of the drawings is a schematic diagram showing a pair of motors M and N of the sort employed in thread spinning apparatus respectively for driving the twisting spindle, and for driving the supply or withdrawal mechanism, together with switching means for controlling the operation of the motors, the switching means being shown in standby, rest or disabled condition.

To illustrate the invention, the drawings show a switching arrangement for controlling motors used in powering a thread twisting machine in which it is necessary, during the starting of the equipment, first to set in motion twisting spindles driven by the motor M, and then, after the expiration of a selected time delay interval, to start the thread-supply or thread-withdrawal mechanism driven by the motor N, the operation of the equipment further requiring stoppage of the twisting spindles only after operation of the thread-supply or withdrawal mechanism is discontinued. Switching mechanism embodying the present invention can, however, be employed in controlling the operation of other textile machinery embodying multiple-motor drives, as, for example, certain bobbin operating devices, thread-curling machines and the like, or in other fields of technology involving multiple-motor drives.

The driving motors M and N may each be controlled by an ordinary relay switch respectively having operating coils A and B and switch blades $1a$—$3a$ and $1b$—$4b$, and auxiliary relay including an operating coil H and associated switch blades $1h$—$4h$. The system also embodies a slow acting or time delay relay embodying an actuating coil Z and switch blades $1z$ and $2z$.

The switches $1a$, $2a$ and $3a$ are all normally open; switches $1b$, $3b$ and $4b$ are also normally open, while the switch $2b$ is normally closed. Switches $1h$ and $4h$ are normally closed, while switches $3h$ and $2h$ are normally open. Switches $1z$ and $2z$ respectively are normally closed and normally open. In addition, the switching means D embodies a normally open start switch marked "on" and a normally closed switch marked "off"; and the system may include a conventional main or disconnect switch S. The auxiliary relay H and its associated switches is interconnected between the motor control relays A and B, in fashion such that the slow acting relay Z will exercise a retarding effect, during the starting operation, upon the thread-supply or withdrawal-device motor N, and upon twisting-spindle motor M during the stopping operation.

To initiate the starting operation, the switch marked "on" may be closed. Accordingly, electric current will then be delivered from the line through the main switch S, the "off" and "on" switches, the normally closed switch $4h$ to the relay coil A, and thence back to the line conductor O.

When energized, the coil A will cause closure of switches $1a$, $2a$ and $3a$, thereby setting the motor M in operation through the switches $2a$ and $3a$ and accomplishing self-maintenance of the energizing circuit through the switch $1a$ after the opening of the starting switch. Simultaneously, the coil Z of the slow acting or time delay switch will be energized through the normally closed switch $2b$. After expiration of a selected time delay interval, the slow acting relay Z opens switch $1z$ and closes switch 2z, thereby energizing relay coil B, which in turn causes closure of the switches 1b, 3b and 4b, and throws the switch 2b from engagement with the coil Z of the slow acting relay and into engagement with the coil H of the auxiliary relay, thereby energizing said coil.

Closure of the switches 3b and 4b will energize the motor N and cause the same to start in operation. Closure of switch 1b will maintain the energizing circuit through the coil B, even after opening of the switches 1h and 4h.

When the coil H becomes energized, as aforesaid, the switches 1h and 4h open and the switches 2h and 3h close. Closure of switch 2h serves to maintain the energizing circuit through the coil H, while closure of the switch 3h serves to maintain the energizing circuit through the coils A and H after the switches 1h and 4h have been opened, as aforesaid, such condition continuing until the switch marked "off" is pressed to initiate the stopping operation.

In order to discontinue operation of the motors M and N, the circuit to the coil B is first interrupted by opening the switch marked "off," thereby deenergizing the coil B and causing the switches 1b, 3b and 4b to open, and the switch 2b to connect the coil Z of the time delay relay with the power supply line and release the coil H of the auxiliary relay, the coil H continuing to be energized through the closed switch 2h. At the expiration of a selected time delay interval, the slow acting relay will serve to open the switch 1z and close the switch 2z, thereby breaking the energizing circuits to the relay coils A, H and Z at the switch 1z. As a consequence, the coil A will become deenergized, thus permitting switches 1a, 2a and 3a to open, thereby disabling the motor M. As soon as the coil H is disconnected from the power supply line by the opening of the switch 1z, the switches 1h and 4h will be restored to their normally closed position, while the switches 3h and 2h will open. Likewise, the switches 1z and 2z will be restored to their normally closed and normally open positions when the coil Z becomes deenergized.

It will be understood, of course, that by the employment of suitable braking devices on the motors M and N, the coasting time may be reduced to any desired extent, in order to obtain short motor stopping intervals, or even to bring the motors to an abrupt halt.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the form herein disclosed being a preferred embodiment for the purpose of illustrating the invention.

The invention is hereby claimed as follows:

1. A switching system for multiple motors comprising a main switching relay for controlling a said motor, a secondary relay for controlling another of said motors, a time delay relay having a normally open and a normally closed switch, and an auxiliary relay having a pair of normally open and a pair of normally closed switches, one of said switching relays embodying a double throw switch, one of the normally closed switches of the auxiliary relay being connected to control the supply of energy to said auxiliary and time delay relays and to the main switching relay to initially energize said relays during motor starting operation of the system, the other normally closed switch of the auxiliary relay being interconnected with the secondary switching relay and the normally open switch of the delay relay, whereby to energize said secondary switching relay in response to delayed operation of the delay relay, during motor starting operation of the system, one of the normally open switches of said auxiliary relay being connected with the normally closed switch of the delay relay to form a circuit for energizing said main switching relay under the control of the delay relay, after the secondary relay has been initially deenergized, when the system is in operation to stop the motors, said secondary relay embodying a switch operable to energize the delay relay when said secondary relay is deenergized.

2. A switching system for multiple motors comprising a main and a secondary switching relay each having normally open switch means for controlling power supply to corresponding motors, said secondary relay having a double throw switch, an auxiliary relay having a pair of normally open and a pair of normally closed switches, a time delay relay having a normally open and a normally closed switch, each of said relays having an actuating coil, a normally open start switch and a normally closed stop switch interconnected in series and in series with one of the normally closed auxiliary relay switches to form a power supply circuit from one side of a power line to the coils of said main, auxiliary and delay relays, and to the secondary relay coil, through the normally open delay relay switch and the normally closed auxiliary relay switch, an auxiliary supply circuit comprising the normally closed delay relay switch and one of the normally open auxiliary relay switches, said auxiliary supply circuit being connected in parallel with said series connected start, stop and auxiliary relay switch, the main switching relay having an extra normally open switch connected in parallel with said start switch, said secondary relay having an extra normally open switch connected in parallel with the series circuit comprising the normally closed auxiliary relay switches and the normally open delay relay switch, circuit means for connecting the coils of the main and secondary relays with the return side of the power line, the auxiliary and delay relay coils being connected to said return side respectively through the normally closed and normally open contacts of said double throw switch, the other normally open auxiliary relay switch being connected in parallel with the normally open contact of the double throw switch.

References Cited in the file of this patent

UNITED STATES PATENTS 2,231,052    Bryson               Feb. 11, 1941